United States Patent
El Kaissi et al.

(10) Patent No.: US 10,318,531 B2
(45) Date of Patent: Jun. 11, 2019

(54) TECHNIQUES FOR SEARCH OPTIMIZATION ON MOBILE DEVICES

(71) Applicant: Microsoft Technology Licensing, LLC, Redmond, WA (US)

(72) Inventors: Muhieddine El Kaissi, Dublin, CA (US); Sidhartha Andrew Palani, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 15/085,004

(22) Filed: Mar. 30, 2016

(65) Prior Publication Data

US 2017/0286488 A1    Oct. 5, 2017

(51) Int. Cl.
G06F 16/957    (2019.01)
G06F 16/2453   (2019.01)
G06F 16/248    (2019.01)
G06F 16/9535   (2019.01)

(52) U.S. Cl.
CPC ...... *G06F 16/24549* (2019.01); *G06F 16/248* (2019.01); *G06F 16/9535* (2019.01); *G06F 16/9574* (2019.01)

(58) Field of Classification Search
CPC ................................. G06F 17/30474
See application file for complete search history.

(56) References Cited

U.S. PATENT DOCUMENTS

| | | | |
|---|---|---|---|
| 8,250,233 B2 * | 8/2012 | Robertson | H04L 47/10 455/412.1 |
| 8,332,488 B1 | 12/2012 | Dale et al. | |
| 2007/0088681 A1 * | 4/2007 | Aravamudan | G06F 16/252 |
| 2008/0270379 A1 | 10/2008 | Ramakrishna | |
| 2010/0306191 A1 | 12/2010 | LeBeau et al. | |
| 2011/0219023 A1 | 9/2011 | Ambrose et al. | |
| 2012/0023097 A1 | 1/2012 | LeBeau et al. | |
| 2014/0067859 A1 | 3/2014 | White | |
| 2016/0063118 A1 | 3/2016 | Campbell et al. | |
| 2016/0070790 A1 | 3/2016 | Bhat et al. | |
| 2016/0179948 A1 | 6/2016 | Carlson | |

(Continued)

FOREIGN PATENT DOCUMENTS

WO    2017172472    10/2017

OTHER PUBLICATIONS

"International Application Serial No. PCT/US2017/023750, International Search Report dated Jun. 30, 2017", 4 pgs.

(Continued)

*Primary Examiner* — Kris E Mackes

(74) *Attorney, Agent, or Firm* — Schwegman Lundberg & Woessner, P.A.

(57) ABSTRACT

In an example embodiment, a hybrid call is introduced. Local data is used to immediately display some search results. The search for local data may be initiated at the same time as a search for non-local data (e.g., server data). A preset number of results from the local data may be displayed first, while remaining results from non-local data may be displayed when such results are returned over the network. By using local data to initially return search results, the time for the searcher to see results is reduced to virtually nothing. Additionally, the local results are typically more relevant to navigational searches than traditional type ahead results.

20 Claims, 14 Drawing Sheets

(56) References Cited

U.S. PATENT DOCUMENTS

2017/0031998 A1    2/2017   Olivier et al.
2017/0286491 A1   10/2017   Kaissi et al.

OTHER PUBLICATIONS

"International Application Serial No. PCT/US2017/023750, Written Opinion dated Jun. 30, 2017", 8 pgs.
"Non Final Office Action Issued in U.S. Appl. No. 15/085,194", dated Jun. 29, 2018, 18 Pages.

* cited by examiner

TECHNIQUES FOR SEARCH OPTIMIZATION ON MOBILE DEVICES

TECHNICAL FIELD

The present disclosure generally relates to computer technology for solving technical challenges in electronic communications. More specifically, the present disclosure relates to techniques for optimizing profile searches on mobile devices.

BACKGROUND

In recent years, it has become more and more prevalent for social networks to be used to create profiles of people and/or companies. Along with the rise in social networks has come a corresponding increase in the number of types of searches performed by website visitors on the social network profiles. Additionally, with the rise of mobile devices, it is becoming more and more common for such searches to be performed from mobile devices, sometimes using dedicated applications (apps) on the mobile devices in lieu of web browsers. Mobile devices, however, are often more bandwidth and processing power-limited than traditional non-mobile computing devices. For example, mobile devices may be connected to the Internet via a cellular connection rather than a Wi-Fi-to-broadband connection. While on the cellular connection, connection speeds may be significantly less than a Wi-Fi-to-broadband connection.

There are generally two types of searches performed for member profiles on a social networking service. The first is called "navigational searching". In navigational searching, the searcher knows a specific element to search and wants to navigate to results containing that specific element as soon as possible. A common example may be a search for a particular member using the member's name. The second type of search is called "exploratory searching". In exploratory searching, the user wants to discover new elements based on generic queries or filters. A common example may be searching based on geographic region.

Search speed is an important factor for user experience, although that is more true for navigational searching than for exploratory searching, because in navigational searching the searcher knows exactly what he wants and wants the results as soon as possible, whereas exploratory searching tends to be more like browsing.

One technique that is used to improve the user experience when performing a search is known as "type ahead." In type ahead, a search is begun before the user finishes typing a search query. Typically the type ahead search query is initiated when the user pauses the typing for more than a preset amount of time. For example, a user may start typing a name, and, after three characters of typing, pause. The system may then perform a search for member profiles containing names having those three characters. A search box may then prepopulate the rest of the search query with one or more suggested completions for the rest of the characters of the search, based on the results, or alternatively the search results themselves may be temporarily displayed in a separate area of the user interface while the searcher finishes typing the search query, giving the searcher feedback as to the types of results the search query would return.

Type ahead tends to return results that are not very relevant, especially when dealing with searches that would commonly return a significant number of results, such as the first two characters of a name (as there may be millions of social network members whose names start with the same two characters). Additionally, on a mobile device on a cellular network, type ahead is slow enough to impact the user experience. It may take several seconds, for example, for the type ahead results to be returned from a server, making any feedback the results provide too late to aid a user in determining whether the characters already entered (and the ones the user intends to enter) are likely to return relevant results.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
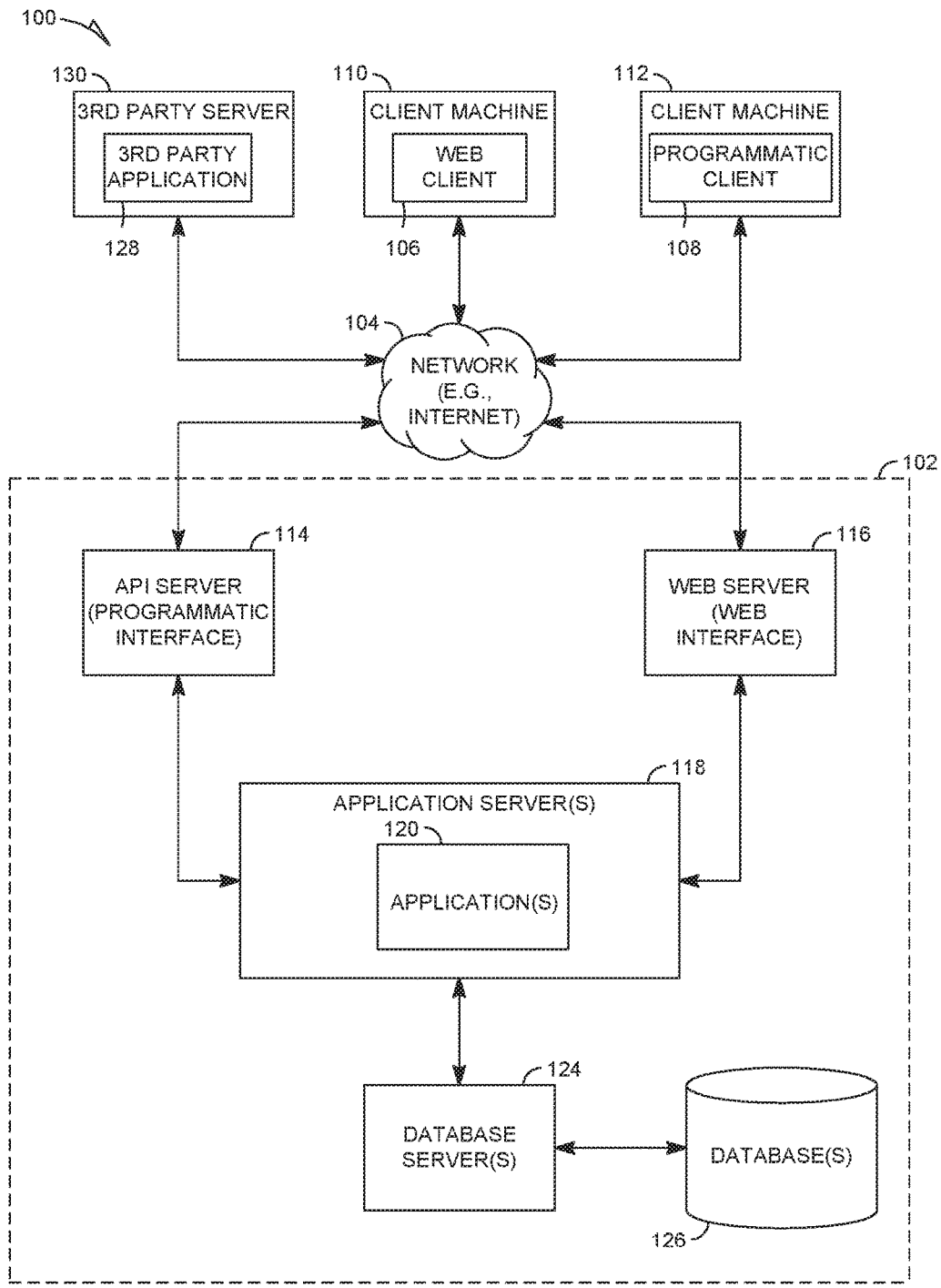
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In example embodiments, solutions are provided that reduce the network bandwidth needed to perform navigational searches on member profiles from mobile devices.

It should be noted that the term "optimize" as used throughout this document is intended to mean "improve" and is not intended to imply perfection in finding the most optimal mechanism for performing an action.

In a first example embodiment, a hybrid call is introduced. In the hybrid call, local data is used to immediately display some search results. The local data may comprise, for example, recently visited member profiles or account pages, and saved member profiles or account pages. The search for local data may be initiated at the same time as a search for non-local data (e.g., server data). A preset number of results from the local data may be displayed first, while remaining results from non-local data may be displayed when such results are returned over the network. By using local data to initially return search results, the time for the searcher to see results is reduced to virtually nothing. Additionally, the local results are typically more relevant to navigational searches than traditional type ahead results. This approach also has the additional benefit of offering native support for a complete offline search, such as when the searcher's mobile device does not have any Internet connectivity (e.g., out of range of a cell tower).

In a second example embodiment, an initial call character delay is introduced. Here, rather than initiate an initial server call for the search based on a delay in the searcher's typing of characters, a set number of characters typed is used as the basis for initiating the search. This approach has the benefit of eliminating calls to the server for searches that will return what are likely to be irrelevant results, such as those using only a single character as a search query.

In a third example embodiment, a local search of non-local search results is introduced. Here, when an initial call to a server for non-local search results is performed, the entire list of non-local search results is saved locally on the mobile device. When subsequent searches are to be performed after additional characters are typed in a search box, these subsequent searches are performed on the list of non-local search results that has been saved locally. As long as a preset, threshold number of matching search results is found from the list of non-local search results that has been saved locally, no additional calls to the server need to be made. If at any point the number of matching search results found from the list of non-local search results that had been saved locally falls below the threshold, then a call to the server is made for a refreshed list of non-local search results, which is also saved locally, and the process repeats itself. In this manner, the number of calls to the server is reduced.

It should be noted that the three example embodiments described above may be utilized alone or in any combination. For example, the second example embodiment and the third example embodiment may be combined to result in an embodiment where an initial call to the server only commences once the initial call character delay has been exceeded, while subsequent searches are performed, if possible, on the returned list of non-local search results saved locally, unless a preset number of matching search results is not found in the returned list of non-local search results saved locally.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112, and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
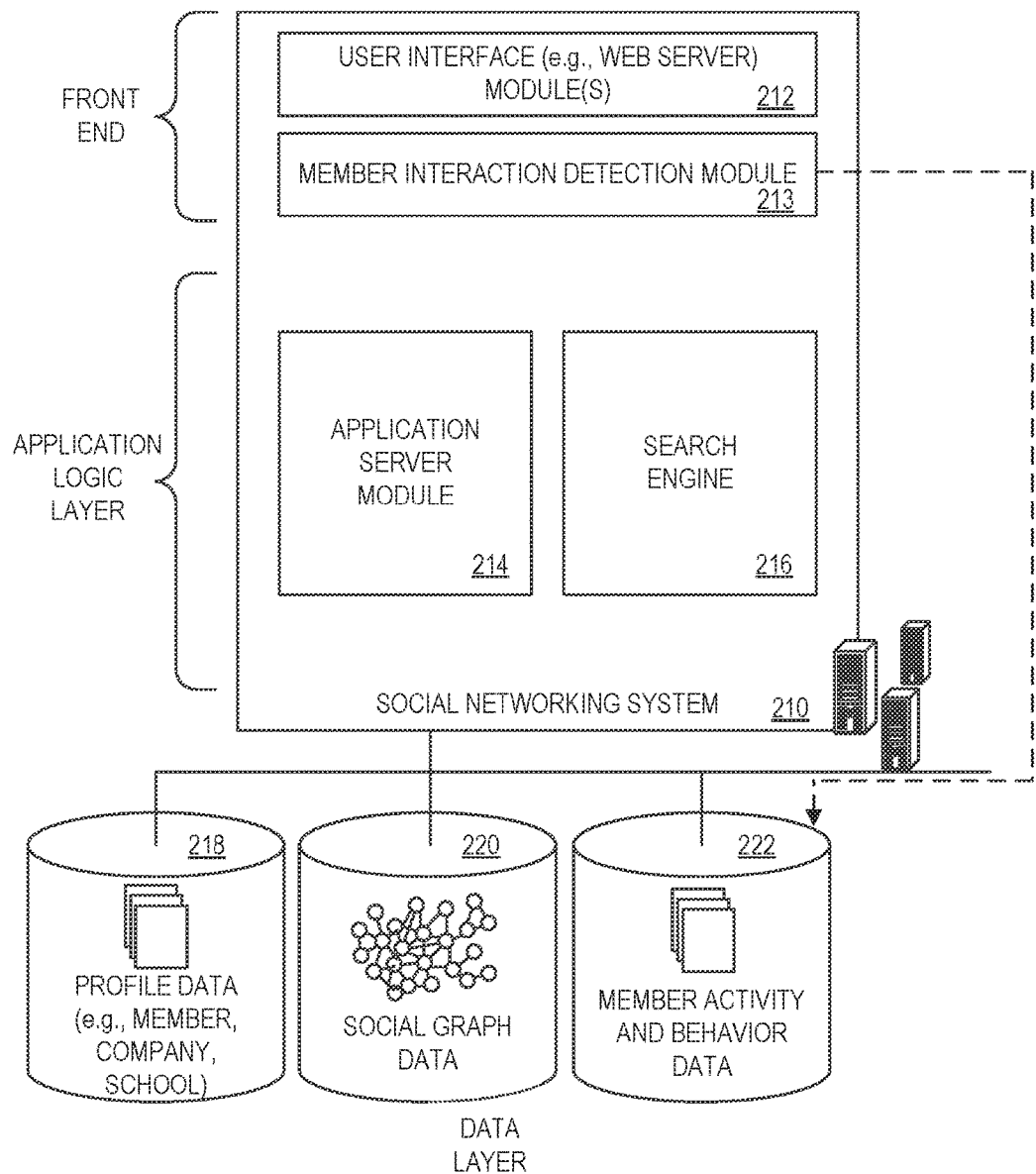
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service system 210, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking system 210. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other objects, are stored and maintained within a social graph in a social graph database 220.

As members interact with the various application(s) 120, services, and content made available via the social networking service system 210, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service system 210. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the organization operating the social networking service system 210, nothing other than data privacy concerns prevents the API from being provided to the public or to certain third parties under special arrangements, thereby making the navigation recommendations available to third party applications 128 and services.

The provided API module may include, for example, a full search API, providing external computing devices, such as client computing devices, with the ability to call full search functions on the social networking service system 210, and a type ahead API, providing external computing devices, such as client computing devices, with the ability to call type ahead functions on the social networking service system 210.

Although the search engine 216 is referred to herein as being used in the context of a social networking service system 210, it is contemplated that it may also be employed in the context of any website or online services. Additionally, although features of the present disclosure are referred to herein as being used or presented in the context of a webpage, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service system 210, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
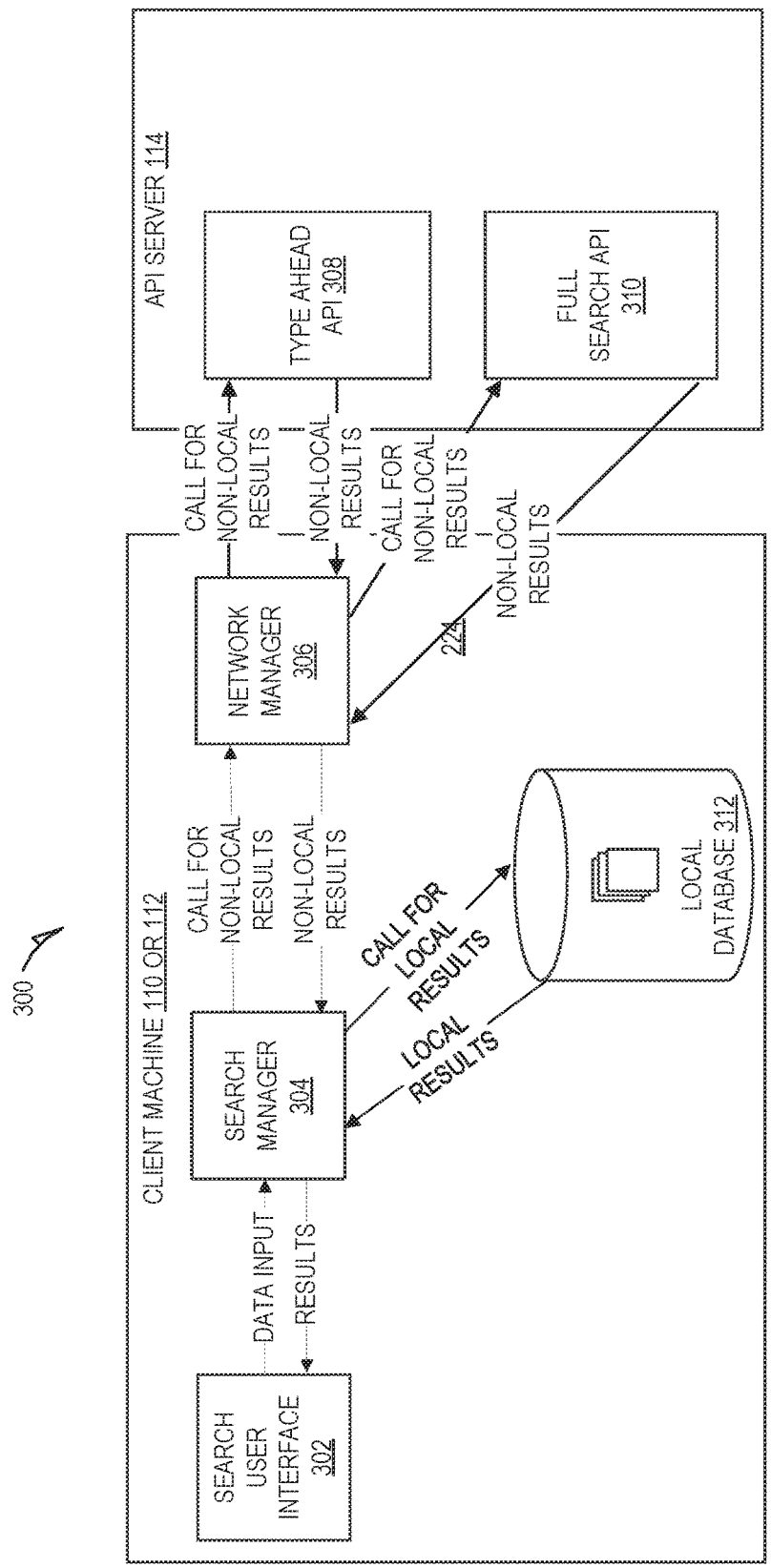
FIG. 3 is a block diagram illustrating a system for searching member profiles in a social networking service in accordance with an example embodiment.

FIG. 3 is a block diagram illustrating a system 300 for searching member profiles in a social networking service in accordance with an example embodiment. A client machine 110 or 112 may include a search user interface 302. The search user interface 302 provides a user interface for a searcher to enter a search query, in the form of data input. As described above, this data input may comprise a complete search query, or merely a portion of a search query (e.g., the first few characters). Nevertheless, data input at the search user interface 302 is sent to a search manager 304. The search manager 304 executes one or more functions to determine the most efficient search strategy in accordance with various example embodiments. Thus, the search manager 304 may be designed to execute, for example, the first, second, and/or third example embodiments described above. As was described earlier and as will also be described later in more detail, the search manager 304 may make calls for non-local results and/or calls for local results. Calls for non-local results may be sent to a network manager 306. The network manager 306 determines one or more APIs, such as type ahead API 308 and/or full search API 310 that may be called so as to return results responsive to the needs of the network manager 306, in order to return non-local results. Calls for local results may be sent directly to a local database 312, where local data such as previously searched and/or saved member profiles and account profiles are saved. The search manager 304 may act to aggregate non-local results and local results in accordance with the example embodiment(s) it is implementing. For example, if the search manager 304 is implementing the first example embodiment, local results from the local database 312 may be obtained, and a preset number of these local results may be sent to the search user interface 302 for display immediately while the search manager 304 waits for the additional results in the form of the non-local results from the network manager 306, which may be delayed due to network bandwidth and/or connectivity issues between the client machine 110 or 112 and the API server 114.

Figure 4:
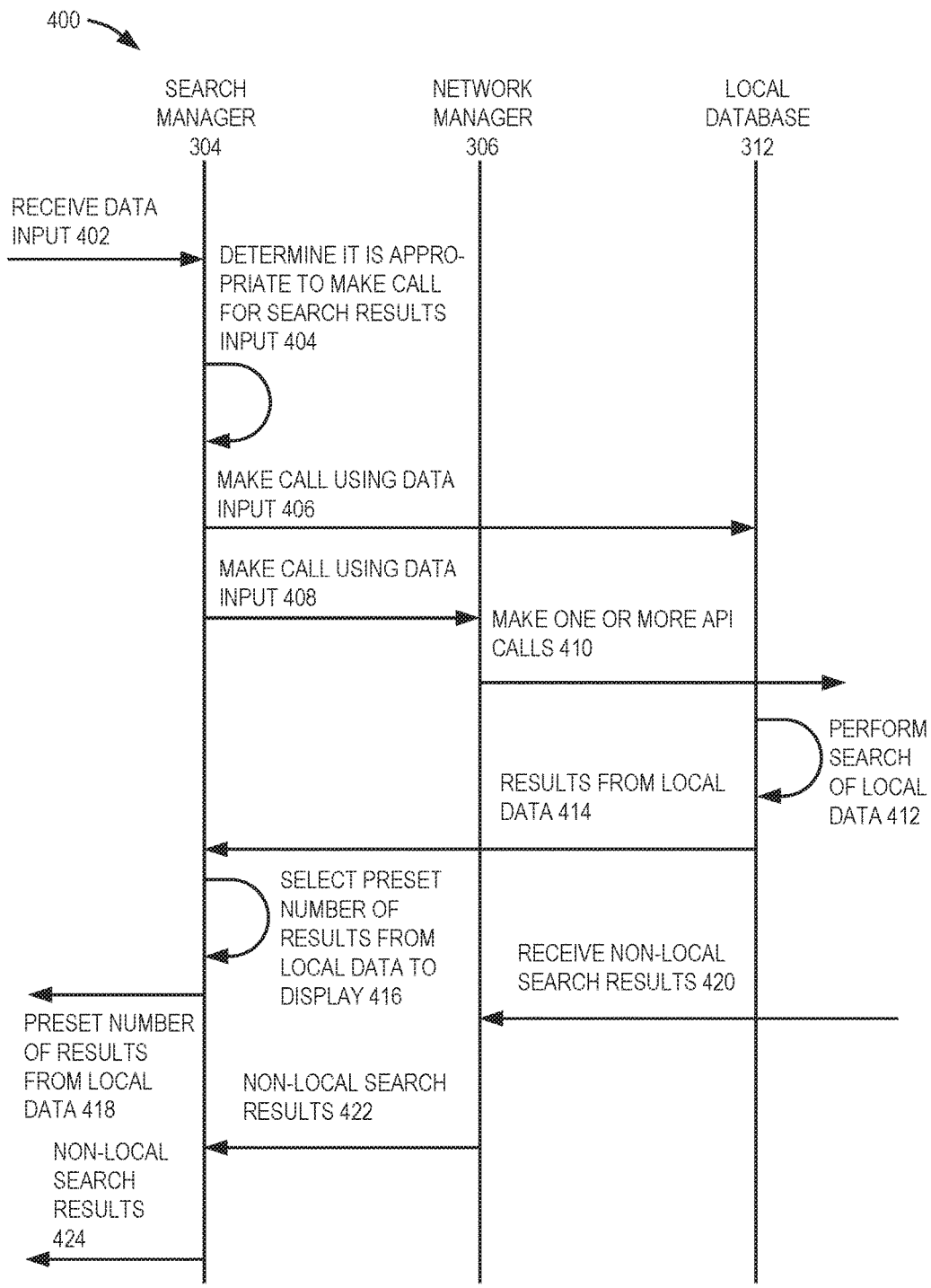
FIG. 4 is an interaction diagram illustrating a method for executing a hybrid call in a search of member profiles in a social networking service in accordance with a first example embodiment.

Turning now to the hybrid call of the first example embodiment, as described above, in the hybrid call, local data is used to immediately display some search results. FIG. 4 is an interaction diagram illustrating a method 400 for executing a hybrid call in a search of member profiles in a social networking service in accordance with a first example embodiment. The method 400 may utilize a search manager 304, a network manager 306, and a local database 312. The local database 312 may include local data containing, for example, recently visited member profiles or account pages, and saved member profiles or account pages. At operation 402, data input from a search user interface 302 (pictured in FIG. 3) may be received. At operation 404, the search manager 304 may determine that it is appropriate for a call to be made for search results responsive to the data input. As described earlier and as will be described in more detail below, this determination may be based on a number of different possible algorithms. In one example embodiment, this determination is made based on a determination that the data input has paused for a time period greater than a preset threshold. In another example embodiment, consistent with the second example embodiment described above and below in more detail, this determination is made based on a determination that a preset number of characters has been entered by a searcher.

Regardless of the mechanism by which the determination is made, once it is determined that it is appropriate for a call to be made for search results responsive to the data input, in response to this determination, operations 406 and 408 may be performed. At operation 406, the data input is used to make a call for local results from the local database 312. At operation 408, the data input is used to make a call for non-local results from the network manager 306. It should be noted that while operation 406 is depicted as being performed prior to operation 408, in example embodiments the ordering of these operations 406, 408 may be reversed, or the operations 406, 408 may be performed simultaneously or nearly simultaneously via parallel processing or other computing techniques.

At operation 410, the network manager 306 makes one or more API calls to an API server 114 (pictured in FIG. 1) to obtain non-local search results responsive to the data input. This may include calls to, for example, a type ahead API 308 or a full search API 310 (both pictured in FIG. 3)

At operation 412, the local database 312 performs search of local data for results responsive to the data input. This may include, for example, performing a search on one or more preselected fields of member profiles and/or account profiles stored in the local database 312. In an example embodiment, these one or more preselected fields include last name and company name. At operation 414, the local database 312 returns the local results to the search manager 304.

At operation 416, the search manager 304 selects a preset number of results from the local results for display. This preset number may be a global variable (i.e., is the same for all searchers and in all circumstances), or may be different in different situations, contexts, and for different searchers. In some example embodiments, this preset number may be dynamically determined at runtime of operation 416 based on identity of the searcher, network connectivity speeds, display size, etc. At operation 418, the search manager 304 sends the selected preset number of results from the local results to the search user interface 302 (FIG. 3) for immediate display.

At operation 420, the network manager 306 receives, from the API server 114, non-local search results responsive to the data input. At operation 422, the network manager 306 forwards the non-local search results to the search manager 304.

At operation 424, the search manager 304 forwards the non-local search results to the search user interface 302 for display in combination with the earlier displayed local search results. In some example embodiments, the search user interface 302 appends the non-local search results to the end of the preset number of local search results already displayed. In other example embodiments, the search user interface 302 (or alternatively the search manager 304) reranks the combined results from both the local search results and the non-local search results so that the results are mixed together.

Figure 5:
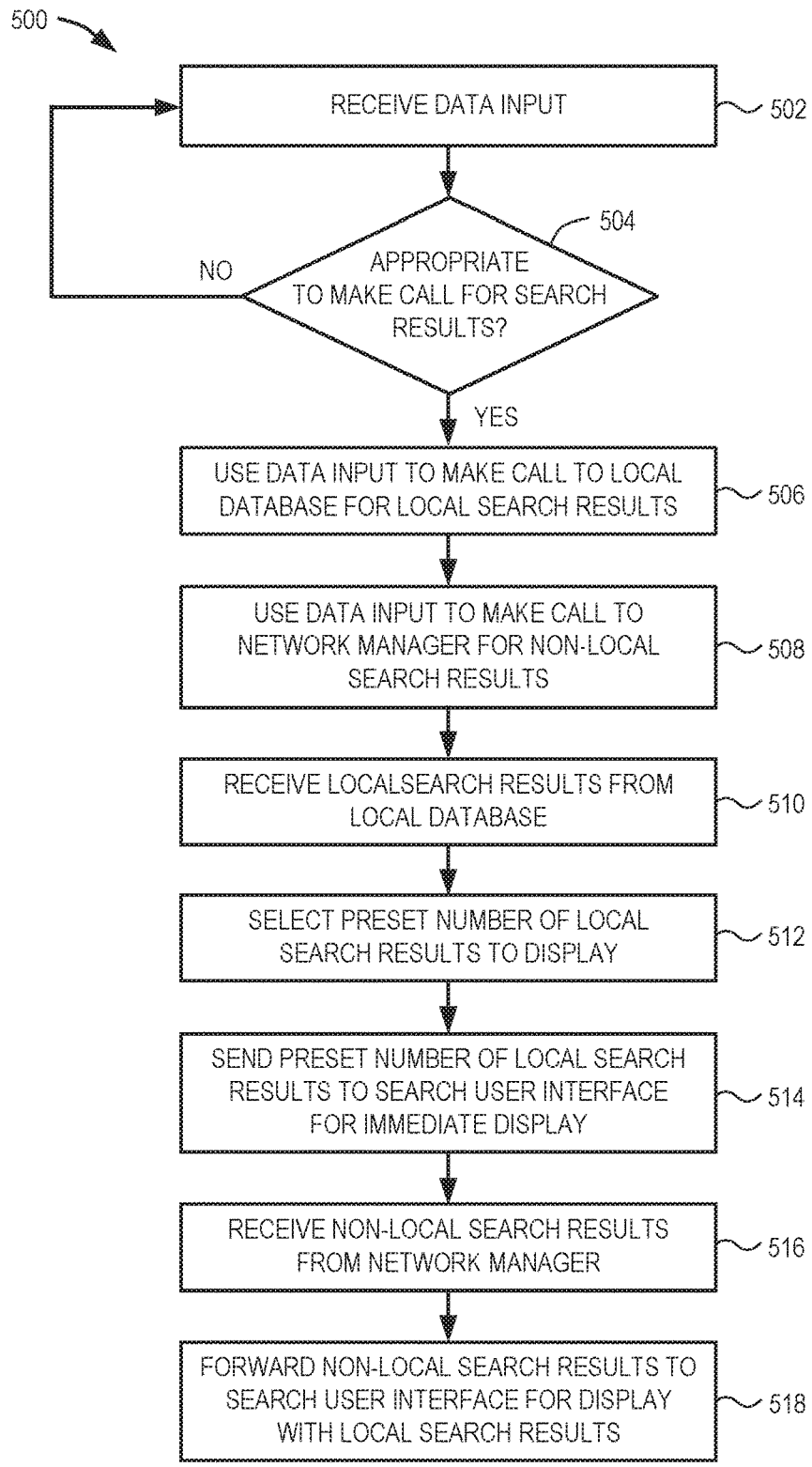
FIG. 5 is a flow diagram illustrating a method for executing a hybrid call in a search of member profiles in a social networking service in accordance with a first example embodiment.

FIG. 5 is a flow diagram illustrating a method 500 for executing a hybrid call in a search of member profiles in a social networking service in accordance with a first example embodiment. The method 500 may be performed, for example, by a search manager 304 of FIG. 3 on a client machine 110 or 112. At operation 502, data input from a search user interface 302 may be received. At operation 504, it may be determined if it is appropriate for a call to be made for search results responsive to the data input. As described earlier and as will be described in more detail below, this determination may be based on a number of different possible algorithms. In one example embodiment, this determination is made based on a determination that the data input has paused for a time period greater than a preset threshold. In another example embodiment, consistent with the second example embodiment described above and below in more detail, this determination is made based on a determination that a preset number of characters have been entered by a searcher. If it is determined that it is not appropriate for a call to be made for search results responsive to the data input, then the method 500 loops back to operation 502, where additional data input may be received. If, however, it is determined that it is appropriate for a call to be made for search results responsive to the data input, then at operation 506 the data input is used to make a call for local results from a local database 312. At operation 508, the data input is used to make a call for non-local results from a network manager 306. It should be noted that while operation 506 is depicted as being performed prior to operation 508, in example embodiments the ordering of these operations may be reversed, or the operations may be performed simultaneously or nearly simultaneously via parallel processing or other computing techniques.

At operation 510, the search manager 304 receives local results from the local database 312. At operation 512, the search manager 304 selects a preset number of results from the local results for display. This preset number may be a global variable (i.e., is the same for all searchers and in all circumstances), or may be different in different situations, contexts, and for different searchers. In some example embodiments, this preset number may be dynamically determined at runtime of operation 510 based on identity of the searcher, network connectivity speeds, display size, etc. At operation 514, the search manager 304 sends the selected preset number of results from the local results to the search user interface 302 for immediate display.

At operation 516, non-local search results are received from the network manager 306. At operation 518, the search manager 304 forwards the non-local search results to the search user interface 302 for display in combination with the earlier displayed local search results. In some example embodiments, the search user interface 302 appends the non-local search results to the end of the preset number of local search results already displayed. In other example embodiments, the search user interface 302 (or alternatively the search manager 304) reranks the combined results from both the local search results and the non-local search results so that the results are mixed together.

Figure 6:
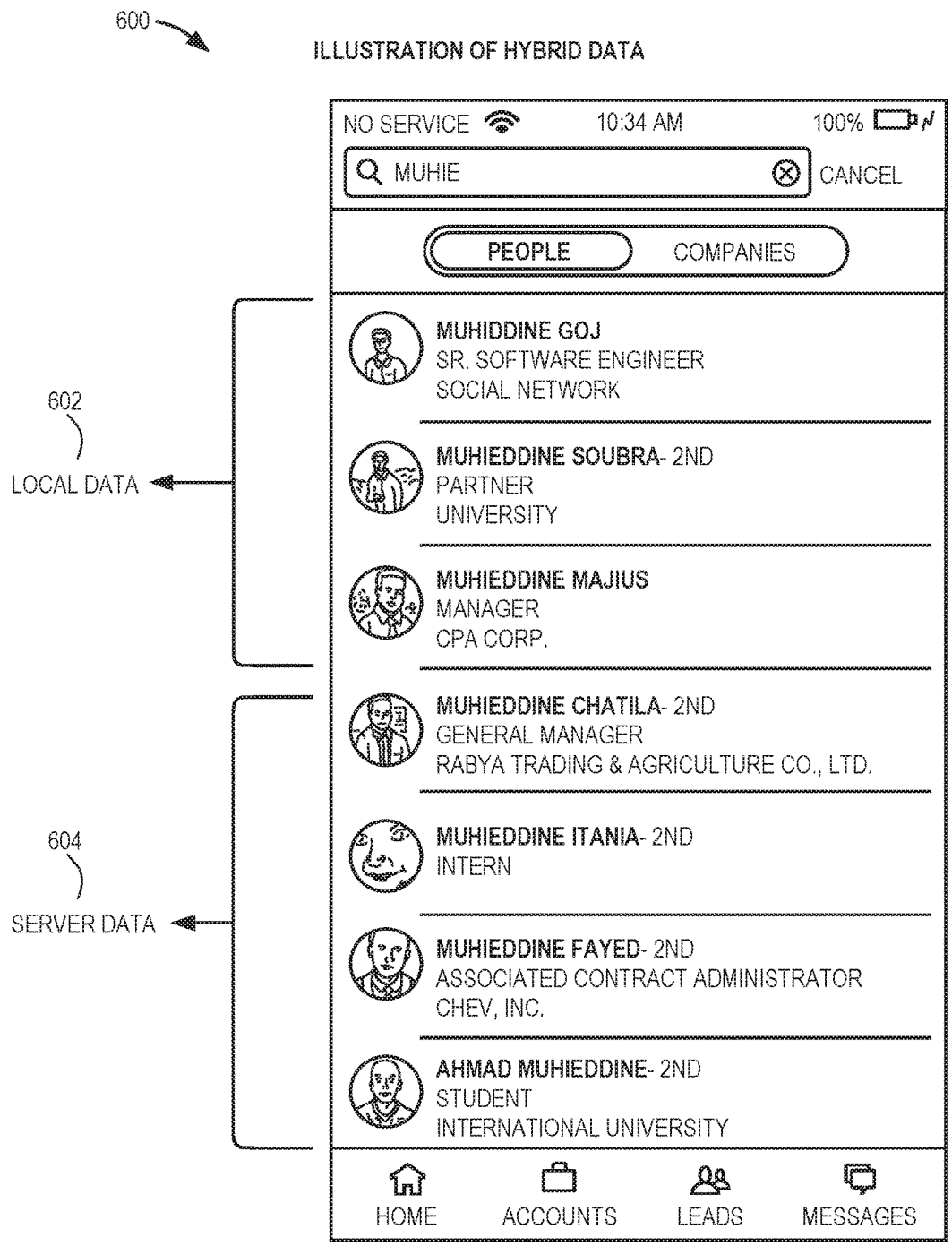
FIG. 6 is a diagram illustrating an example user interface of a mobile device in accordance with an example embodiment.

FIG. 6 is a diagram illustrating an example user interface 600 of a mobile device in accordance with an example embodiment. Here, the user interface 600 is depicted in a state following when the search manager 304 has provided the search user interface 302 with both the local results and the non-local results. As can be seen, the preset number of local results are displayed at 602, with a remainder of non-local results displayed at 604. Although such a scenario is not pictured, local results 602 may appear to the user before non-local results 604 appear, due to the delay in obtaining non-local results 604 via a mobile device.

Turning now to the initial call character delay of the second example embodiment, as described above, rather than initiate an initial server call for the search based on a delay in the searcher's typing of characters or some other factor, a set number of characters typed is used as the basis for initiating the search. This approach has the benefit of eliminating calls to the server for searches that will return what are likely to be irrelevant results, such as those using only a single character as a search query.

Figure 7:
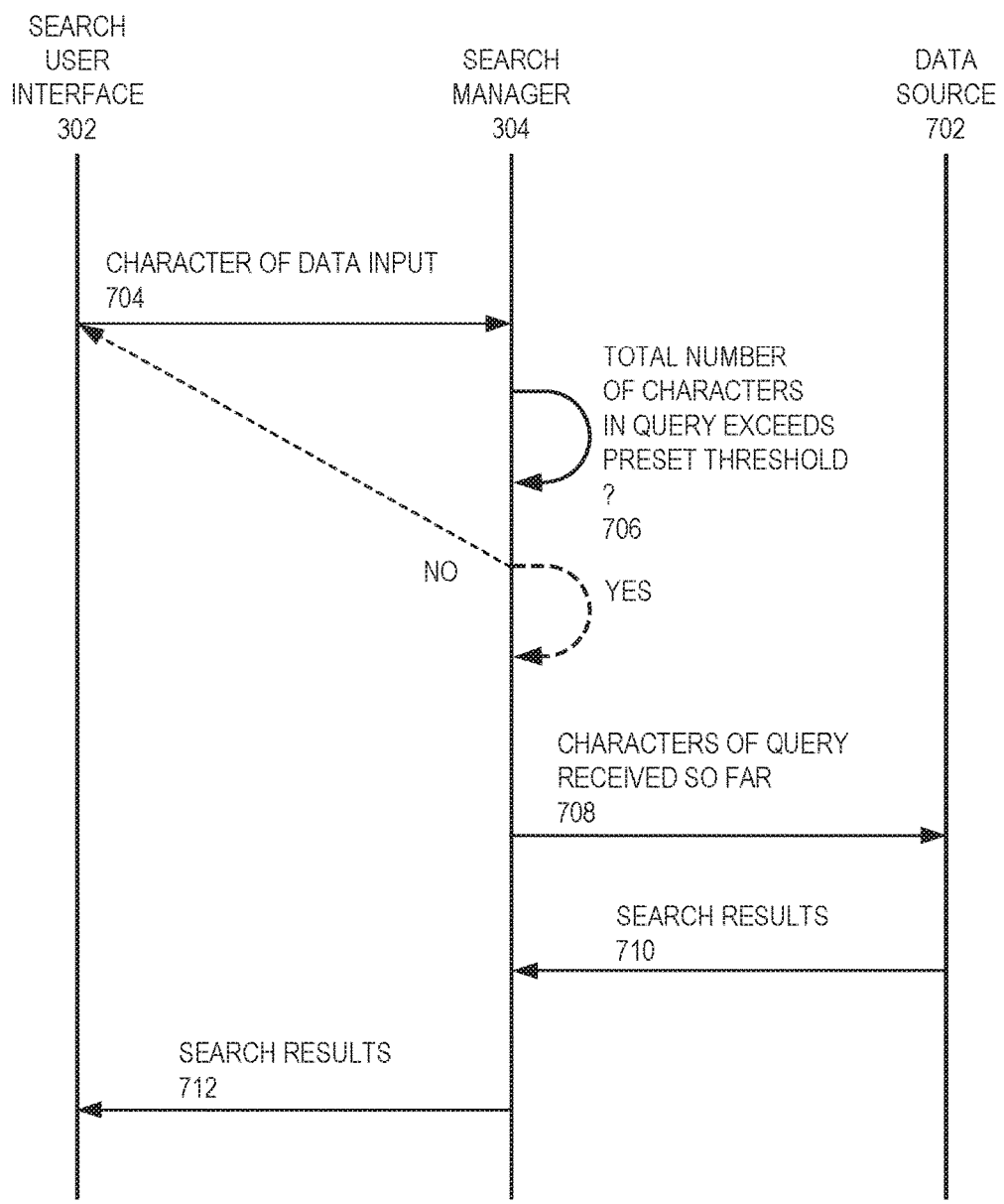
FIG. 7 is an interaction diagram illustrating a method for executing a initial call character delay in a search of member profiles in a social networking service in accordance with a second example embodiment.

FIG. 7 is an interaction diagram illustrating a method 700 for executing an initial call character delay in a search of member profiles in a social networking service in accordance with a second example embodiment. The method 700 may utilize the search user interface 302, the search manager 304, and a data source 702. It should be noted that data source 702 may be either a local data source, such as local database 312 (pictured in FIG. 3), or a remote data source, such as API server 114. At operation 704, the search user interface 302 forwards a character of data input of a search query to the search manager 304. At operation 706, the search manager 304 determines whether, in response to the receiving of this character, a total number of characters of the search query exceeds a preset threshold. If not, then the method 700 loops back to operation 704 to receive the next character. If so, however, then at operation 708, the search manager 304 sends the characters of the search query received so far to the data source 702. At operation 710, the data source 702 returns results responsive to the characters of the search query received so far. At operation 712, the search manager 304 sends the results to the search user interface 302 for display.

It should be noted that in embodiments where the second embodiment is combined with embodiments where separate calls are made to local and non-local data sources, operations 708-712 may be expanded to encompass such separate calls as well as the separate receiving of search results and the resultant handling operations for dealing with such separately received search results, such as, for example, by utilizing operations similar to operations 406-424 of FIG. 4.

Figure 8:
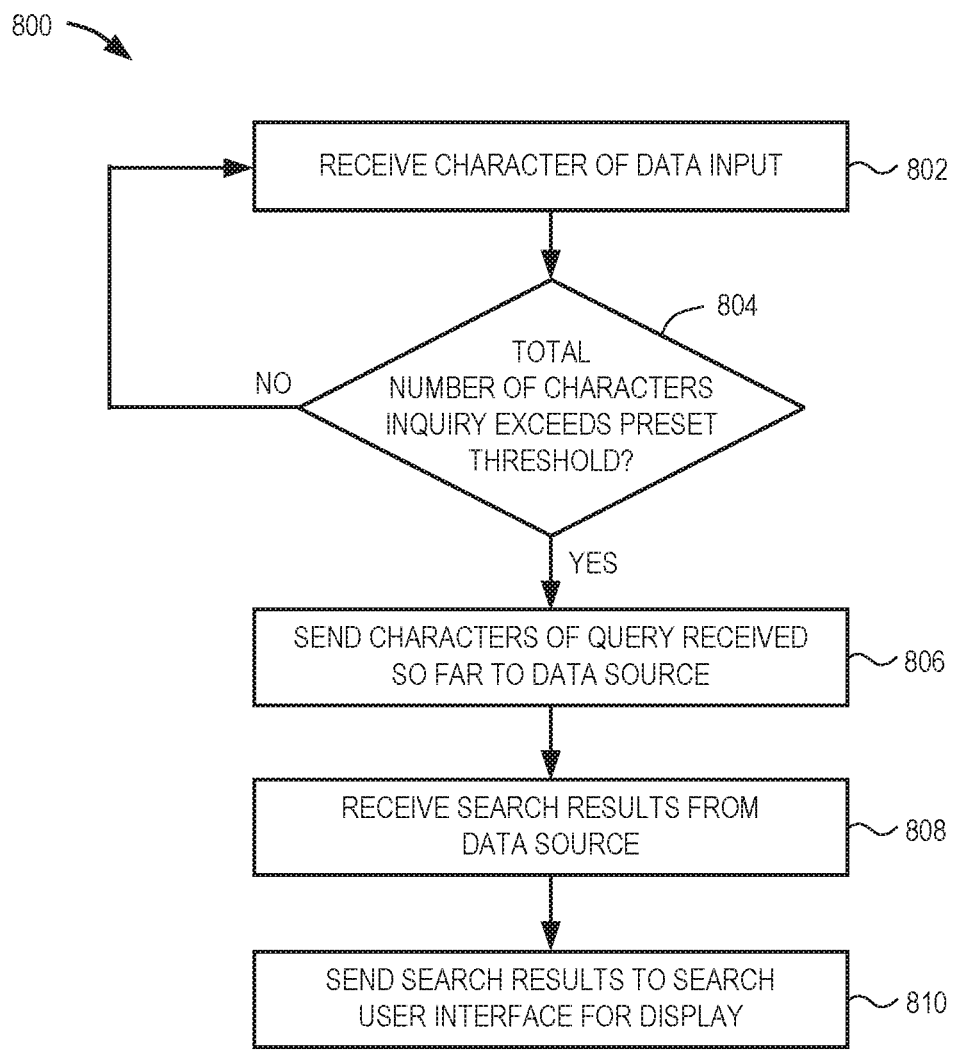
FIG. 8 is a flow diagram illustrating a method for executing a hybrid call in a search of member profiles in a social networking service in accordance with a second example embodiment.

FIG. 8 is a flow diagram illustrating a method 800 for executing a hybrid call in a search of member profiles in a social networking service in accordance with a second example embodiment. The method 800 may be performed, for example, by the search manager 304 of FIG. 3 on a client machine 110 or 112. At operation 802, a character of data input in a search query is received from the search user interface 302. At operation 804, it may be determined if the total number of characters received in the search query exceeds a preset number of characters. If not, then the method 800 loops back to operation 802. If so, however, then at operation 806 the search manager 304 sends the characters of the search query received so far to a data source. At operation 808, the data source returns results responsive to the characters of the search query received so far. At operation 810, the search manager 304 sends the results to the search user interface 302 for display.

Figure 9:
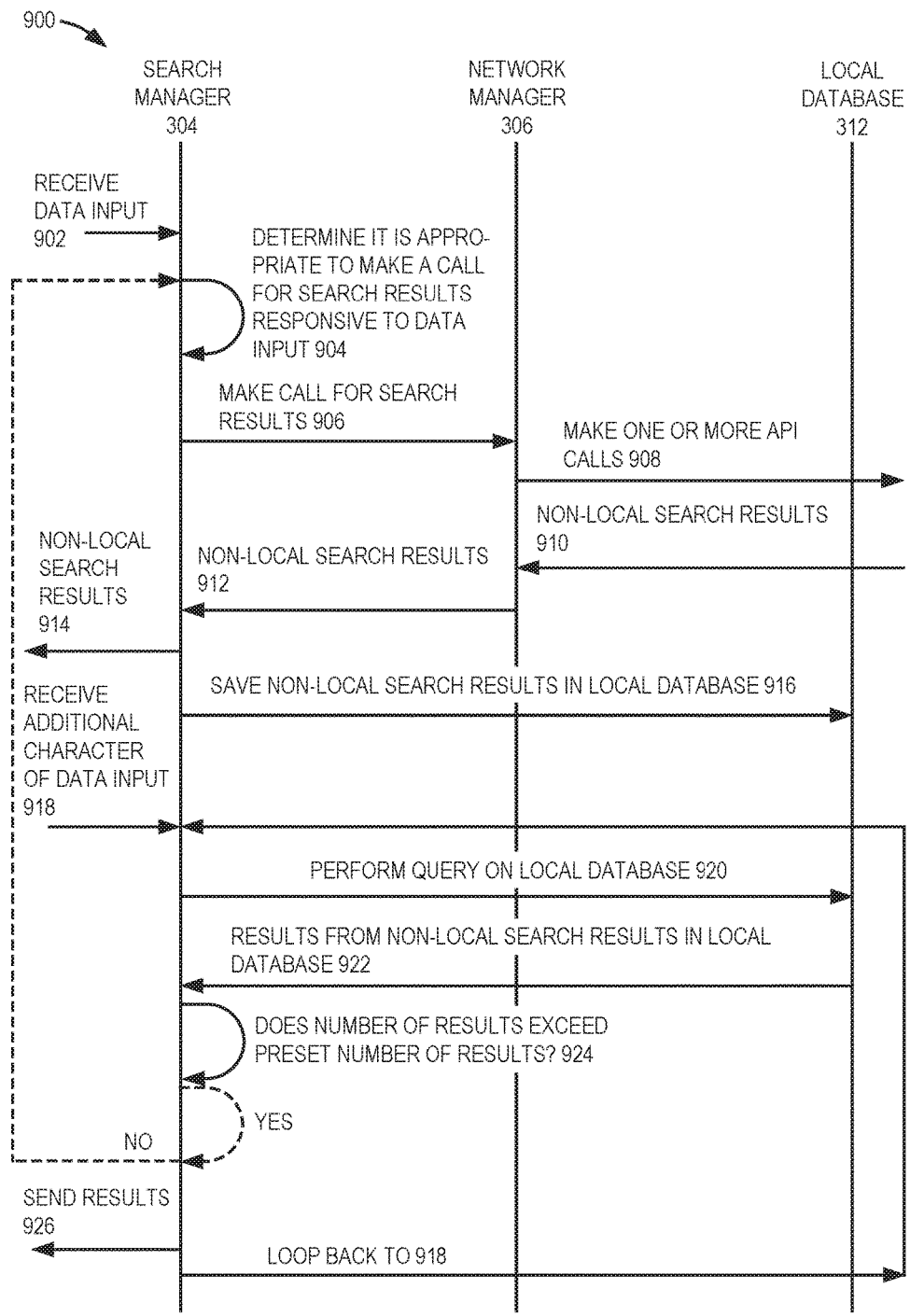
FIG. 9 is an interaction diagram illustrating a method for performing a local search of non-local search results of a query for member or account profiles of a social networking service in accordance with a third example embodiment.

Turning now to the local search of non-local search results of the third embodiment, FIG. 9 is an interaction diagram illustrating a method 900 for performing a local search of non-local search results of a query for member or account profiles of a social networking service in accordance with the third example embodiment. The method 900 may utilize a search manager 304, a network manager 306, and a local database 312.

At operation 902, a character of data input of the query is received from the search user interface 302 (pictured in FIG. 3). At operation 904, the search manager 304 may determine that it is appropriate for a call to be made for search results responsive to the data input. As described earlier, this determination may be based on a number of different possible algorithms. In one example embodiment, this determination is made based on a determination that the data input has paused for a time period greater than a preset threshold. In another example embodiment, consistent with the second example embodiment described above and below in more detail, this determination is made based on a determination that a preset number of characters have been entered by a searcher.

Regardless of the mechanism by which the determination is made, if it is determined that it is not yet appropriate for such a call to be made, then the process loops back to operation 902. Once it is determined that it is appropriate or a call to be made for search results responsive to the data input, in response to this determination, at operation 906 the search manager 304 makes a call to the network manager 306 for non-local results responsive to the query (at least the portion of the query received so far).

At operation 908, the network manager 306 makes one or more API calls to an API server 114 (FIG. 1) to obtain non-local search results responsive to the data input. This may include calls to, for example, a type ahead API 308 or a full search API 310 (pictured in FIG. 3)

At operation 910, the network manager 306 receives, from the API server 114 (not pictured), non-local search results responsive to the data input. At operation 912, the network manager 306 forwards the non-local search results to the search manager 304.

At operation 914, the search manager 304 forwards the non-local search results to the search user interface 302 for display. At operation 916, the non-local search results are saved in the local database 312. It should be noted that for ease of readability of the present disclosure, these non-local search results will continue to be referred to as non-local search results even though they are, from this point forward, stored locally. This will aid in distinguishing between local search results that were stored in the local database 312 and previous unrelated queries.

At operation 918, an additional character of data input for the query is received at the search manager 304. At operation 920, the query, including any characters received so far as data input for the query, is performed on the non-local search results saved in the local database 312. At operation 922, the local database 312 returns results, if any, to the query from the non-local search results stored locally on the local database 312. At operation 924, it is determined if the total number of results to the query from the non-local search results stored locally on the local database 312 is greater than a preset number of results. This preset number may be a global variable (i.e., is the same for all searchers and in all circumstances), or may be different in different situations, contexts, and for different searchers. In some example embodiments, this preset number may be dynamically determined at runtime of operation 924 based on identity of the searcher, network connectivity speeds, display size, etc. If it is determined at operation 924 that the total number of results to the query from the non-local search results stored locally on the local database 312 is greater than a preset number of results, then at operation 926, the search manager 304 sends the non-local search results stored locally on the local database 312 to the search user interface 302 for display. The method 900 then loops back to operation 918.

If it is determined at operation 924 that the total number of results to the query from the non-local search results stored locally on the local database 312 is not greater than a preset number of results, then the method 900 loops back to operation 904, so that fresh results can be obtained from a non-local data source.

Figure 10:
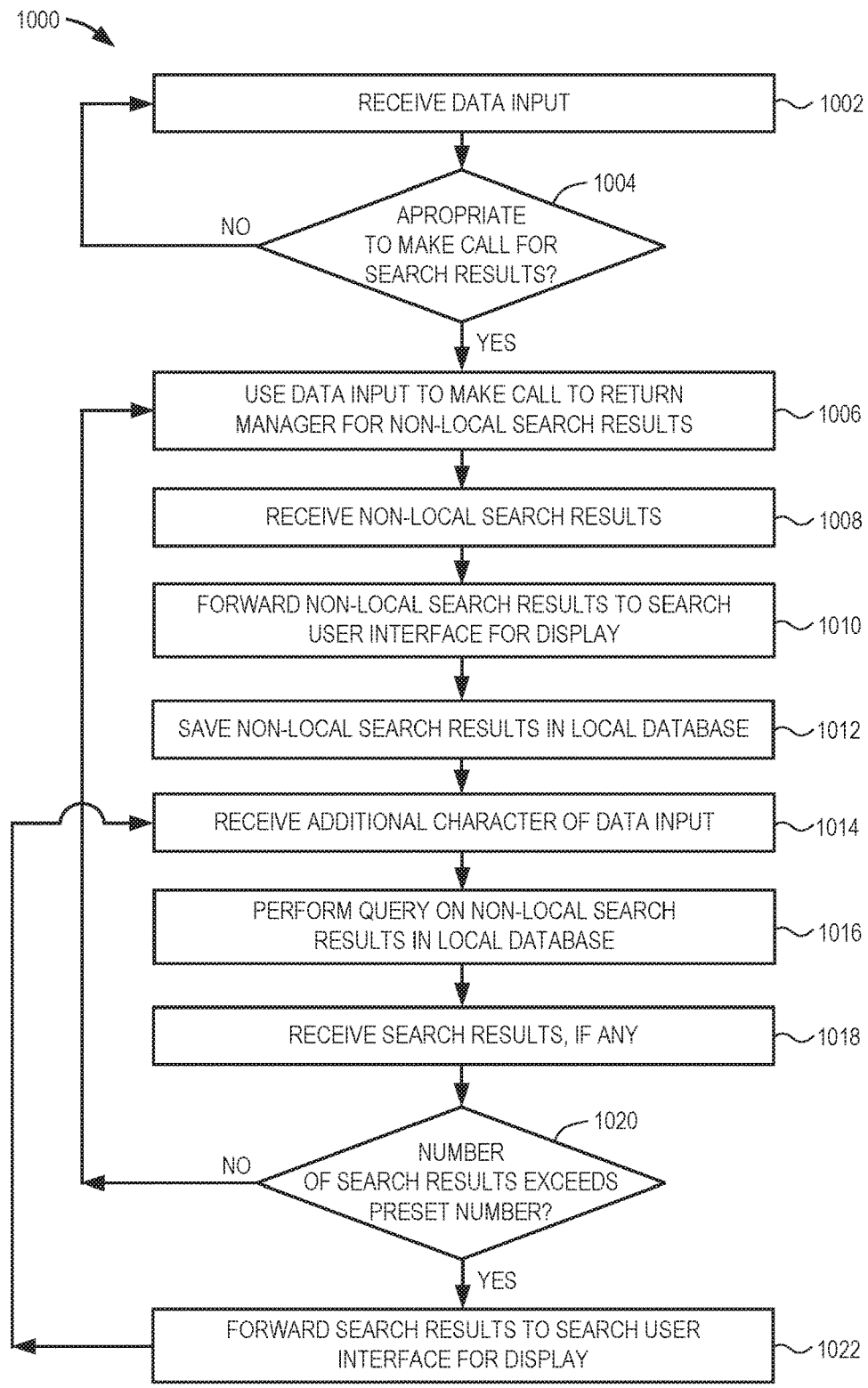
FIG. 10 is a flow diagram illustrating a method for performing a local search of non-local search results of a query for member or account profiles of a social networking service in accordance with the third example embodiment.

FIG. 10 is a flow diagram illustrating a method 1000 for performing a local search of non-local search results of a query for member or account profiles of a social networking service in accordance with the third example embodiment. The method 1000 may be performed by a search manager 304. At operation 1002, a character of data input of the query is received from a search user interface 302. At operation 1004, it is determined if it is appropriate for a call to be made for search results responsive to the data input. As described earlier, this determination may be based on a number of different possible algorithms. In one example embodiment, this determination is made based on a determination that the data input has paused for a time period greater than a preset threshold. In another example embodiment, consistent with the second example embodiment described above and below in more detail, this determination is made based on a determination that a preset number of characters have been entered by a searcher.

Regardless of the mechanism by which the determination is made, if it is determined that it is not yet appropriate for such a call to be made, then the method 1000 loops back to operation 1002. Once it is determined that it is appropriate or a call to be made for search results responsive to the data input, in response to this determination, at operation 1006 the search manager 304 makes a call to the network manager 306 for non-local results responsive to the query (at least the portion of the query received so far).

At operation 1008, non-local search results are received from the network manager 306. At operation 1010, the non-local search results are forwarded to the search user interface 302 for display. At operation 1012, the non-local search results are saved in a local database 312.

At operation 1014, an additional character of data input for the query is received. At operation 1016, the query, including any characters received so far as data input for the query, is performed on the non-local search results saved in the local database 312. At operation 1018, results, if any, to the query from the non-local search results stored locally on the local database 312, are received. At operation 1020, it is determined if the total number of results to the query from the non-local search results stored locally on the local database 312 is greater than a preset number of results. This preset number may be a global variable (i.e., is the same for all searchers and in all circumstances), or may be different in different situations, contexts, and for different searchers. In some example embodiments, this preset number may be dynamically determined at runtime of operation 1020 based on identity of the searcher, network connectivity speeds, display size, etc. If it is determined at operation 1020 that the total number of results to the query from the non-local search results stored locally on the local database 312 is greater than a preset number of results, then at operation 1022, the non-local search results stored locally on the local database 312 are sent to the search user interface 302 for display. The method 1000 then loops back to operation 1014.

If it is determined at operation 1020 that the total number of results to the query from the non-local search results stored locally on the local database 312 is not greater than a preset number of results, then the method 1000 loops back to operation 1006, so that fresh results can be obtained from a non-local data source.

Figure 11:
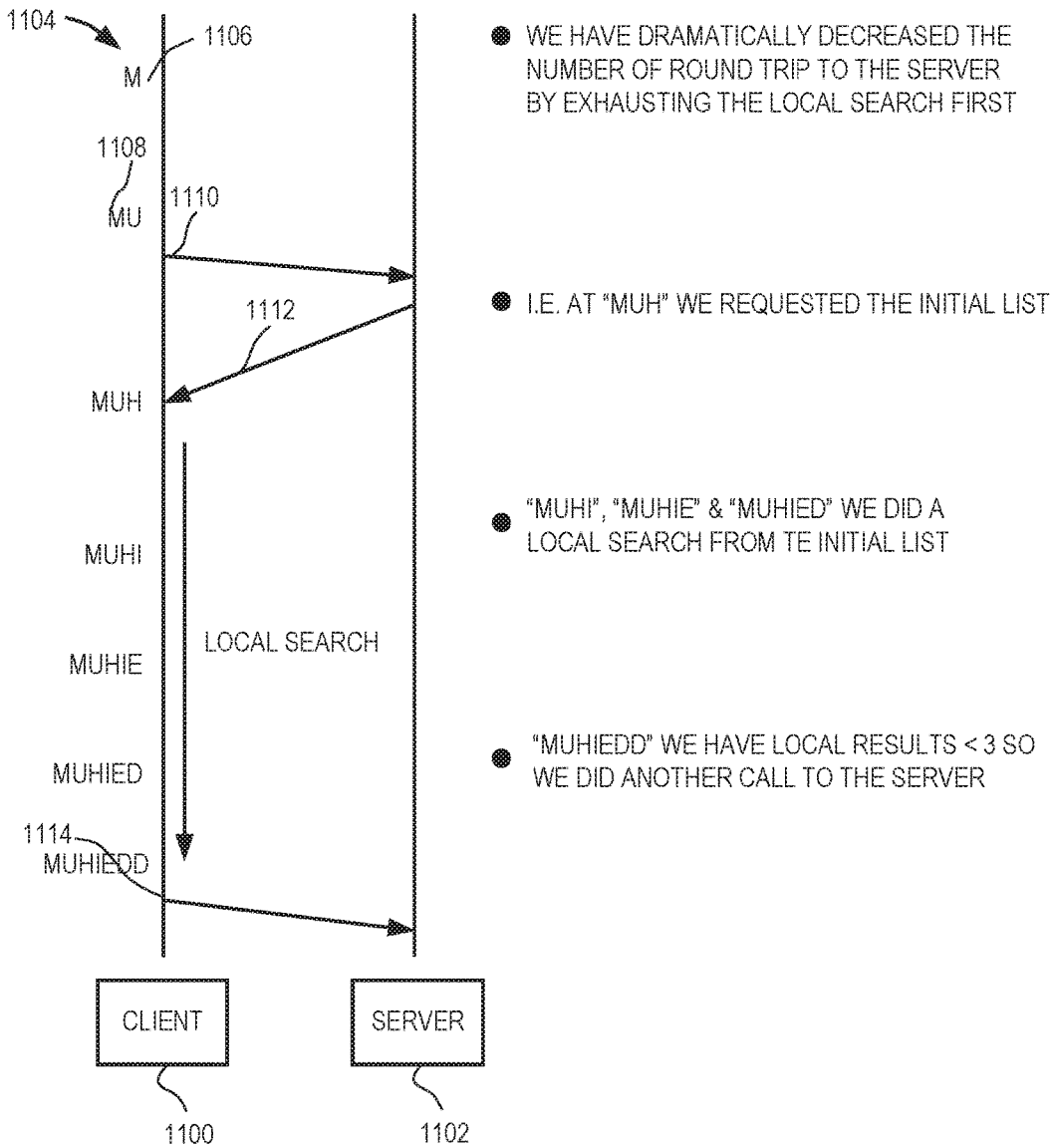
FIG. 11 is a diagram illustrating an example of operations of the third example embodiment.

FIG. 11 is a diagram illustrating an example of operation of the third example embodiment. Here, the components involved in the third example embodiment are generalized to a client 1100 and server 1102. Column 1104 depicts a query as characters are input by a user on the client 1100. Thus, for example, at 1106, the user has typed "M" while at 1108, the user has also then added "u" to the query. For whatever reason, at 1110, the client 1100 determines that it is appropriate to perform a search on the query so far. As such, at 1110 a query is generated to the server 1102 for non-local results. These non-local results are returned at 1112 and stored locally on the client 1100. Subsequent searches caused by additional character input are performed on this locally stored version of the non-local results, until such time as the number of results returned by the locally stored version of the non-local results does not exceed a preset threshold. Here, this is illustrated at 1114, where the search term "Muhiedd" does not return enough search results from the locally stored version of the non-local results obtained from the server 1102 in response to the search term "Mu" at 1108. Thus, at 1114, the query ("Muhiedd") is generated to the server 1102 for non-local results and the process repeats.

Figure 12:
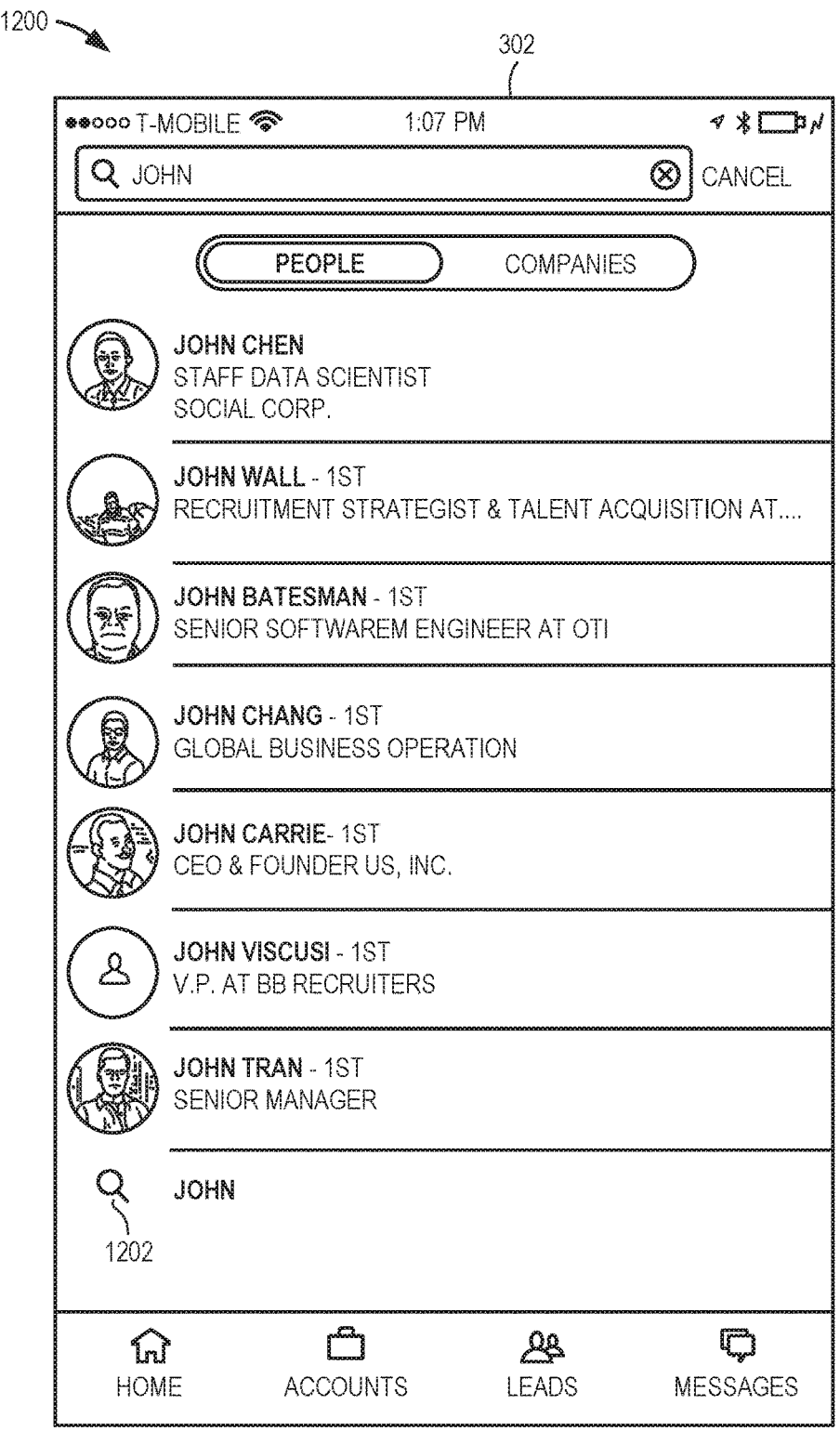
FIG. 12 is diagram illustrating a search user interface in accordance with an example embodiment.

In some example embodiments compatible with all three of the example embodiments specified above, the network manager 306 defaults to utilizing the type ahead API 308 whenever attempting to search non-local results. This default may be overridden, however, by a user or administrator. In one example embodiment, a user interface is provided to searchers that includes a specialized area in which to indicate that an override should be performed. FIG. 12 is diagram illustrating a search user interface 302 in accordance with an example embodiment. Here, the search user interface 302 includes a search box 1200, where a searcher may type characters for a search. The default is that as characters are typed in this search box 1200, the various searches described above with respect to the three different example embodiments may be performed using the type ahead API 308. The search user interface 302 additionally includes an override button 1202, here in the form of a magnifying glass next to which the characters entered in the search box 1200 are reproduced. If the user selects this override button 1202, then the various searches described above with respect to the three different embodiments may be performed using the full search API 310.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
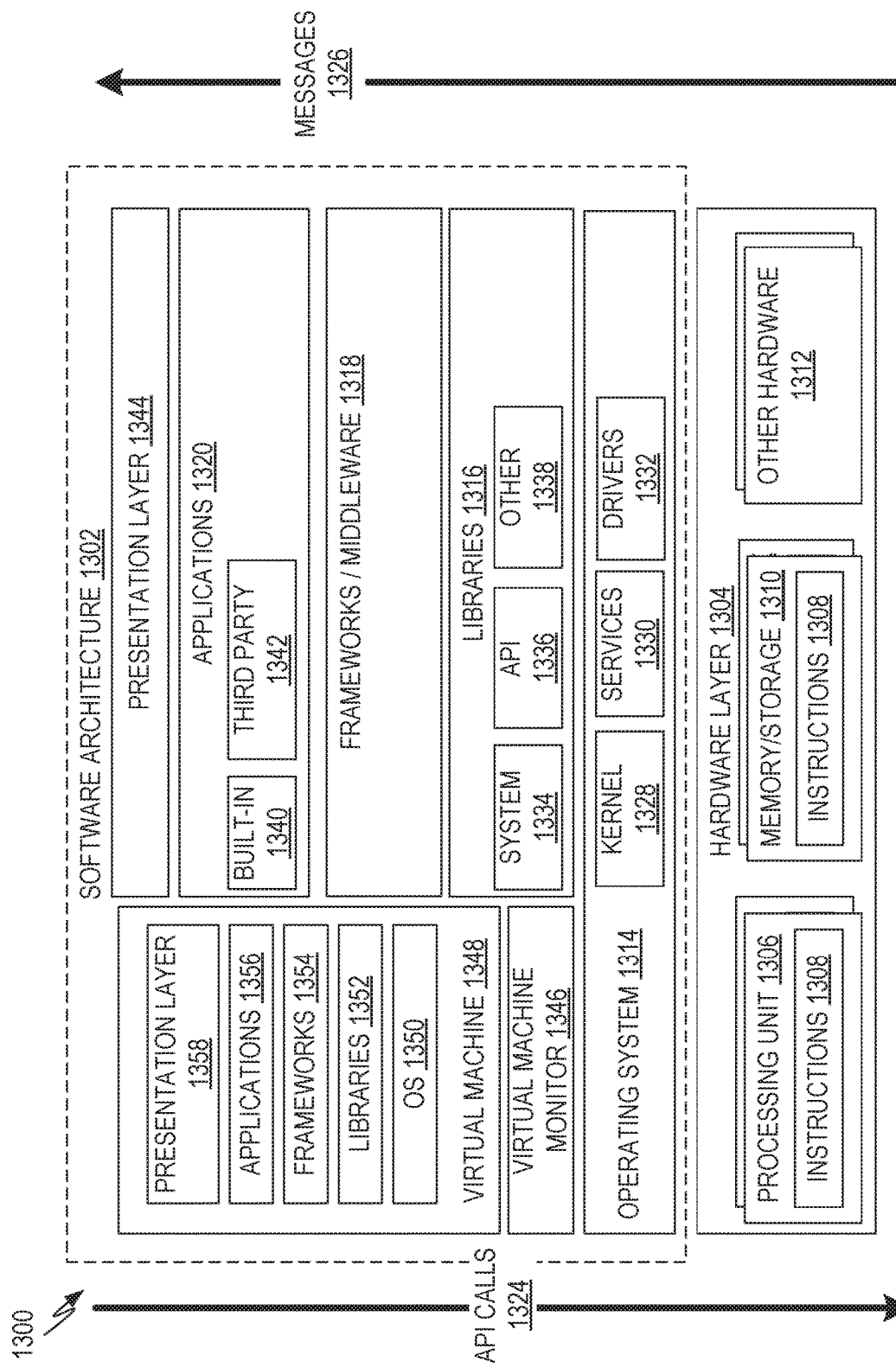
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive responses, returned values, and so forth, illustrated as messages 1326, in response to the API calls 1324. The layers illustrated are representative in nature and not all software architectures have all layers. For example, some mobile or special purpose operating systems may not provide a layer of frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third party applications 1342. Examples of representative built-in applications 1340 may include, but are not limited to, a contacts application, a browser application, a book reader application, a location application, a media application, a messaging application, and/or a game application. The third party applications 1342 may include any of the built-in applications 1340 as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system, such as the operating system 1314, to facilitate functionality described herein.

The applications 1320 may utilize built-in operating system 1314 functions (e.g., kernel 1328, services 1330, and/or drivers 1332), libraries 1316 (e.g., system libraries 1334, API libraries 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). A virtual machine is hosted by a host operating system (e.g., operating system 1314 in FIG. 13) and typically, although not always, has a virtual machine monitor 1346, which manages the operation of the virtual machine 1348 as well as the interface with the host operating system (e.g., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
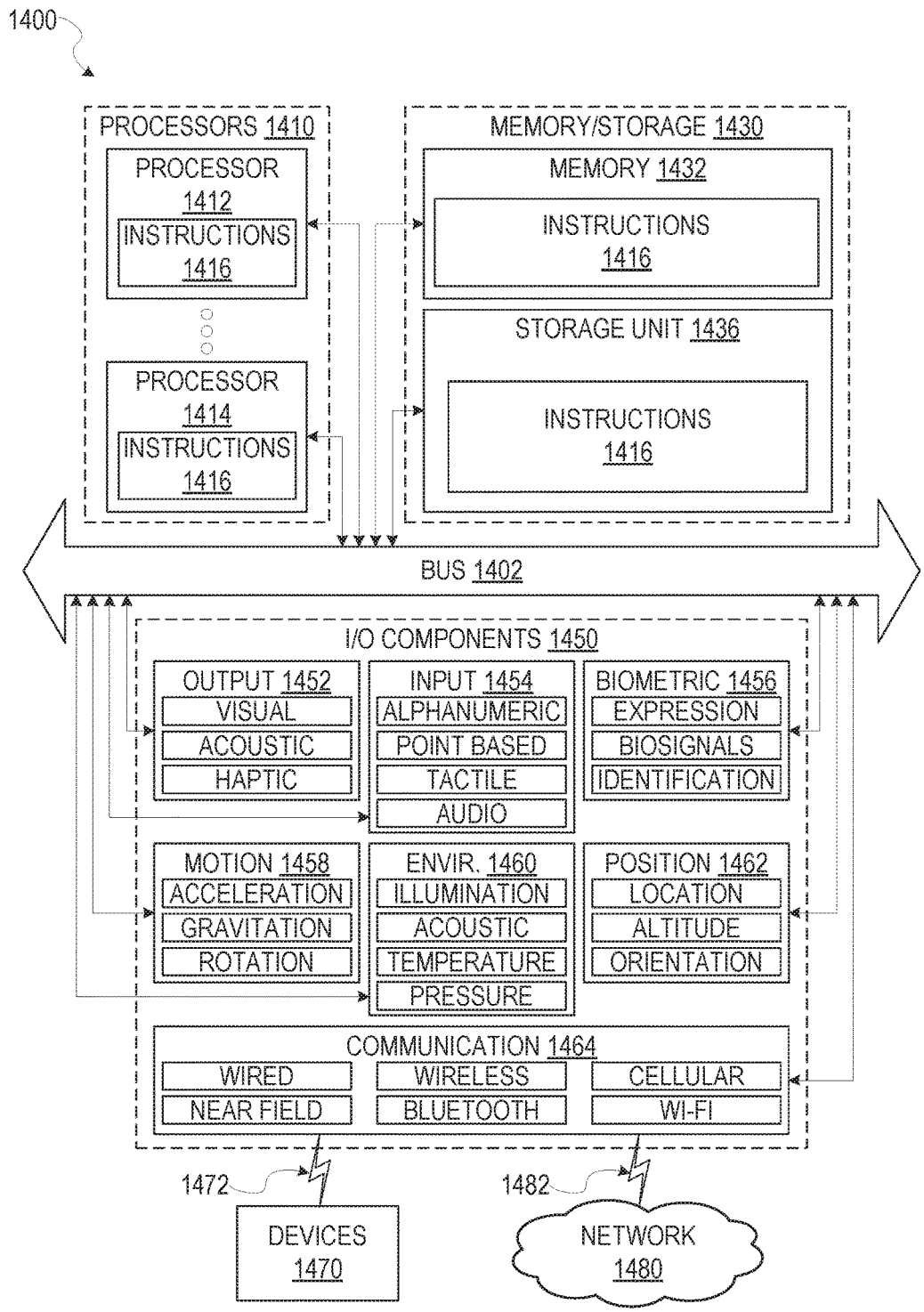
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions 1416 transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions (e.g., instructions 1416) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method for executing a hybrid call in a search performed on a mobile device, the method comprising:

receiving a portion of a query via a first interaction by a user with a graphical user interface of the mobile device;

determining if it is appropriate for a call to be made for search results responsive to a search based on the portion of the query;

in response to a determination that it is appropriate for a call to be made for search results responsive to the portion of the query:

calling, based on the first interaction, for results to the search from a local database on the mobile device;

calling, based on the first interaction and without an intervening interaction by the user with the graphical user interface, for results to the search from a non-local data source separated from the mobile device by a network;

receiving results to the search from the local database;

displaying at least a portion of the results to the search from the local database in the graphical user interface of the mobile device, wherein the displaying occurs subsequently to the calling for results from the non-local data source, wherein the portion is limited to preset maximum of search results, the preset maximum being fewer search results than can be displayed in a single screen of the graphical user interface;

subsequently to displaying the results to the search from the local database in the graphical user interface of the mobile device:

receiving results to the search from the non-local data source; and displaying the results to the search from the non-local data source in the graphical user interface of the mobile device, at least a portion of the results to the search from the non-local data store being displayed on the same single screen as the results to the search from the local database.

2. The method of claim 1, wherein the network is a cellular network.

3. The method of claim 1, wherein the displaying the results to the search from the non-local data source includes appending the results to the search from the non-local data source to the results to the search from the local database in the user interface.

4. The method of claim 1, wherein the displaying the results to the search from the non-local data source includes mixing the results to the search from the non-local data source with the results to the search from the local database in the user interface.

5. The method of claim 1, wherein the determining if it is appropriate for a call to be made for search results responsive to the portion of the query is based on a determination that a delay time between characters entered in the user interface exceeds a threshold delay time.

6. The method of claim 1, wherein the determining if it is appropriate for a call to be made for search results responsive to the portion of the query is based on a determination that a preset number of characters has been entered.

7. The method of claim 6, wherein the preset number of characters is determined dynamically based on identity of a search and bandwidth of the network.

8. A system comprising:

a computer-readable medium having instructions stored there on, which, when executed by a processor, cause the system to:

receive a portion of a query via a first interaction by a user with a graphical user interface of the mobile device;

determine if it is appropriate for a call to be made for search results responsive to a search based on the portion of the query;

in response to a determination that it is appropriate for a call to be made for search results responsive to the portion of the query:

call, based on the first interaction, for results to the search from a local database on the mobile device;

call, based on the first interaction and without an intervening interaction by the user with the graphical user interface, for results to the search from a non-local data source separated from the mobile device by a network;

receive results to the search from the local database;

display at least a portion of the results to the search from the local database in the graphical user interface of the mobile device, wherein the displaying occurs subsequently to the calling for results from the non-local data source, wherein the portion is limited to preset maximum of search results, the preset maximum being fewer search results than can be displayed in a single screen of the graphical user interface;

subsequently to displaying the results to the search from the local database in the graphical user interface of the mobile device:

receive results to the search from the non-local data source; and display the results to the search from the non-local data source in the graphical user interface of the mobile device, at least a portion of the results to the search from the non-local data store being displayed on the same single screen as the results to the search from the local database.

9. The system of claim 8, wherein the network is a cellular network.

10. The system of claim 8, wherein the displaying the search results from the non-local data source includes appending the search results from the non-local data source to the search results from the local database in the user interface.

11. The system of claim 8, wherein the displaying the results to the search from the non-local data source includes mixing the results to the search from the non-local data source with the results to the search from the local database in the user interface.

12. The system of claim 8, wherein the determining if it is appropriate for a call to be made for search results responsive to the portion of the query is based on a determination that a delay time between characters entered in the user interface exceeds a threshold delay time.

13. The system of claim 8, wherein the determining if it is appropriate for a call to be made for search results responsive to the portion of the query is based on a determination that a preset number of characters has been entered.

14. The method of claim 13, wherein the preset number of characters is determined dynamically based on identity of a search and bandwidth of the network.

15. A non-transitory machine-readable storage medium comprising instructions, which when implemented by one or more machines, cause the one or more machines to perform operations comprising:

receiving a portion of a query via a first interaction by a user with a graphical user interface of the mobile device;

determining if it is appropriate for a call to be made for search results responsive to a search based on the portion of the query;

in response to a determination that it is appropriate for a call to be made for search results responsive to the portion of the query:

calling, based on the first interaction, for results to the search from a local database on the mobile device;

calling, based on the first interaction and without an intervening interaction by the user with the graphical user interface, for results to the search from a non-local data source separated from the mobile device by a network;

receiving results to the search from the local database;

displaying at least a portion of the results to the search from the local database in the graphical user interface of the mobile device, wherein the displaying occurs subsequently to the calling for results from the non-local data source, wherein the portion is limited to preset maximum of search results, the preset maximum being fewer search results than can be displayed in a single screen of the graphical user interface;

subsequently to displaying the results to the search from the local database in the graphical user interface of the mobile device:

receiving results to the search from the non-local data source; and displaying the results to the search from the non-local data source in the graphical user interface of the mobile device, at least a portion of the results to the search from the non-local data store being displayed on the same single screen as the results to the search from the local database.

16. The non-transitory machine-readable storage medium of claim 15, wherein the network is a cellular network.

17. The non-transitory machine-readable storage medium of claim 15, wherein the displaying the results to the search from the non-local data source includes appending the results to the search from the non-local data source to the results to the search from the local database in the user interface.

18. The non-transitory machine-readable storage medium of claim 15, wherein the displaying the results to the search from the non-local data source includes mixing the results to the search from the non-local data source with the results to the search from the local database in the user interface.

19. The non-transitory machine-readable storage medium of claim 15, wherein the determining if it is appropriate for a call to be made for search results responsive to the portion of the query is based on a determination that a delay time between characters entered in the user interface exceeds a threshold delay time.

20. The non-transitory machine-readable storage medium of claim 15, wherein the determining if it is appropriate for a call to be made for search results responsive to the portion of the query is based on a determination that a preset number of characters has been entered.

* * * * *